United States Patent [19]
Kato et al.

[11] 4,158,650
[45] Jun. 19, 1979

[54] PROCESS FOR PRODUCING MODIFIED PHENOLIC RESIN

[75] Inventors: Nobukatsu Kato; Tsutomu Takase, both of Nagoya; Yoshio Morimoto, Tokai; Takashi Kataoka; Minoru Hattori, both of Nagoya, all of Japan

[73] Assignee: Mitsui Toatsu Chemicals, Inc., Tokyo, Japan

[21] Appl. No.: 927,780

[22] Filed: Jul. 25, 1978

[30] Foreign Application Priority Data

Aug. 4, 1977 [JP] Japan .................. 52-92969
Sep. 12, 1977 [JP] Japan .................. 52-108920
Sep. 26, 1977 [JP] Japan .................. 52-114709
Nov. 17, 1977 [JP] Japan .................. 52-137244

[51] Int. Cl.$^2$ .................. C08G 8/32; C08G 8/34
[52] U.S. Cl. .................. 260/19 UA; 260/19 R; 260/25; 260/410.5
[58] Field of Search .................. 260/19 UA, 19 R, 25, 260/410.5

[56] References Cited

U.S. PATENT DOCUMENTS

| | | | |
|---|---|---|---|
| 2,587,578 | 3/1952 | Jones | 260/19 R |
| 2,985,600 | 5/1961 | Barr et al. | 260/19 R |
| 3,048,508 | 8/1962 | Boiney et al. | 260/19 UA |
| 3,632,785 | 1/1972 | Bornstein | 260/25 |
| 3,763,104 | 10/1963 | Buchanan | 260/25 |

FOREIGN PATENT DOCUMENTS 2647321 5/1977 Fed. Rep. of Germany.
384864 2/1965 Switzerland.

OTHER PUBLICATIONS

Chemical Abstracts, vol. 82, No. 8, Feb. 24, 1975, p. 44016g.

*Primary Examiner*—Ronald W. Griffin
*Attorney, Agent, or Firm*—Fisher, Christen, & Sabol

[57] ABSTRACT

A drying oil such as isomerized linseed oil, dehydrated castor oil or the like oil which has an iodine value of more than 140 and a content of conjugated double bonds of less than 50% is reacted with isopropenylphenol and/or oligomers thereof in an amount, by weight, of 0.1-2 times as great as that of the drying oil in the presence of a small amount of an acid at a temperature of 65-150° C. for 0.5-3 hours. By the reaction, isopropenylphenol and/or its oligomers are introduced to the drying oil while leaving the double bonds of the oil as they are without disappearance. The thus introduced oil is further reacted with a phenol or phenols under strongly acidic conditions to introduce the phenols thereto. The drying oil which has been introduced with the isopropenylphenol and/or its oligomers and also with the phenols is mixed with a phenol or phenols and then reacted with formaldehyde to give a modified phenolic resin. This phenolic resin is useful for making a phenolic laminate with improved flexibility, punching quality and water proof.

5 Claims, No Drawings

PROCESS FOR PRODUCING MODIFIED PHENOLIC RESIN

BACKGROUND OF THE INVENTION

This invention relates to a process for producing a modified phenolic resin by using drying oils introduced with phenols.

It is well known that phenolic laminates can be obtained by impregnating substrates with a resol-type phenolic resin obtained by interacting a phenol such as phenol, cresol, xylenol or the like and formaldehyde, and superposing these substrates under heating and pressurizing conditions. The obtained laminate had industrially wide utility in the field of electric insulating materials and structural materials. In recent years, the laminate has particularly received much greater application to electric and electronic instruments. Since parts of these instruments have become simpler in assembling, more compact and higher in performance, there is a strong and growing demand for laminates which have excellent electrical insulating property and resistances to heat and alkali with balanced mechanical strengths and punching quality.

In particular, the laminate of the type mentioned above is being applied as printed circuits in very large demand and, in this field, it is used by punching in desired forms. In general, however, the phenolic resin is so hard and brittle that, upon punching, the resin-impregnated laminate must be processed under heating conditions of 100°–150° C., with the attendant disadvantage that the punched article invariably involves undesirable variation in size due to its expansion and contraction during the process and warp due to residual stress. In addition, the heating step is troublesome. In order to overcome these disadvantages, there have been proposed several methods for making phenolic laminates.

In order to improve the punching quality, for example, it is known from old to use a modified phenolic resin added with a drying oil such as tung oil which contains large amount of conjugated double bonds. However, though the punching quality can be surely improved by the modification due to the mere addition of the drying oil, other properties or strengths remain considerably poor.

Accordingly, there is proposed another method in which the drying oil is further modified. That is, the drying oil containing large amount of conjugated double bonds is reacted with phenols under acidic conditions, followed by further reaction with formaldehyde. By such modification, the punching quality can be improved while increasing a crosslinking density of the impregnated modified phenolic resin to prevent lowering of other characteristic properties. In this method, it is essential to use tung oil which contains large amount of conjugated double bonds and which has great chemical reactivity with phenols. Chinese tung oil has, for example, the following fatty acid composition: 81.5% of α-eleastearic acid; 6.7% of linolic acid; 6.4% of oleic acid; 2.9% of stearic acid; and 2.5% of palmitic acid. Since tung oil thus contains 80% or more of conjugated double bonds in the main chain thereof, it is readily reacted with phenols in the presence of an acidic catalyst.

However, even though the phenol-modified tung oil is used to make a laminate, the laminate still remains poor in interlaminar strength and thus tends to delaminate. This is due to a fact that since the reaction of tung oil and a phenol in the presence of an acidic catalyst is the Friedel-Crafts reaction which proceeds under severe conditions, polymerization of tung oil inevitably takes place during the reaction and the resulting resin is hard to impregnate in substrate. The laminate using such modified resin is unsatisfactory for use in small-sized, precise parts.

Instead of using tung oil, there may be considered application, to the above method, of other drying oils such as isomerized linseed oil, dehydrated castor oil, tall oil, and perilla oil, which have high content of non-conjugated double bonds and low content of conjugated double bonds. However, this is very difficult and the reason for this will be described by way of dehydrated castor oil. Dehydrated castor oil is a glyceride of linolic acid which is obtained by dehydrating ricinoleic acid to be a main component of castor oil, and has the following fatty acid composition: 29% of conjugated linolic acid; 58% of non-conjugated linolic acid; 7.5% of oleic acid; 5.0% of ricinoleic acid; and 0.5% of palmitic acid and stearic acid. The drying oil having such low content of conjugated double bonds is poorer in chemical reactivity than those having higher content of conjugated double bonds. If these drying oils having low content of conjugated double bonds are used instead of tung oil to conduct the above method, introduction of phenols to these oils become insufficient. When applied for making a laminate, the modified resin does not undergo a satisfactory crosslinking reaction, making it difficult to produce a laminate with excellent electrical and mechanical properties, resistance to chemicals and moisture and water proofs.

Introduction of phenols to drying oils which are poor in chemical reactivity and low in content of conjugated double bonds is described in Japanese Patent Publication No. 45-35918. In this method, dehydrated castor oil is reacted with phenol in the presence of a sulfuric acid catalyst at elevated temperature. However, this method is accompanied with a difficulty that since large amount of sulfuric acid is used as the catalyst, Glauber's salt produced by neutralization of the acid impedes the moisture and water proofs and electrical properties of resulted laminates.

It is therefore an object of the present invention to provide a process for modifying a drying oil, which has low content of conjugated double bonds and is poor in reactivity, by reaction with phenols to give a phenol-modified oil which is effective in improving properties of a phenolic resin.

It is another object of the present invention to provide a process for producing a modified phenolic resin using the modified drying oil, the phenolic resin being useful in making a laminate which exhibits excellent punching quality, electric characteristics, moisture and water proofs, chemical resistance, and mechanical properties.

According to the present invention, there is provided a process for producing a phenolic resin modified with a phenol-introduced drying oil, the process comprising the steps of:

reacting a drying oil having an iodine value of more than 140 and a content of conjugated double bonds of less than 50% with isopropenylphenol and/or oligomers thereof in the presence of an acidic catalyst and in the presence or absence of a phenol or phenols to introduce the isopropenylphenol and/or oligomers thereof to the drying oil;

further reacting the introduced drying oil with a phenol or phenols in the presence of an acidic catalyst to introduce the phenol or phenols to the drying oil; and providing the drying oil which has been introduced with the isopropenylphenol and/or oligomers thereof and also with the phenol or phenols as a part of a phenolic component and subjecting the phenolic component to reaction with formaldehyde.

The term "drying oils" as used herein is intended to imply drying oils of plant and animal origins which have an iodine value of more than 140 and in which the content of unsaturated fatty acids having conjugated double bonds is less than 50% of a total of fatty acids which constitute the drying oil, and also synthetic drying oils which are obtained by treating plant or animal oils by a suitable means such as isomerization, dehydration or distillation and extraction. The term "unsaturated fatty acids having conjugated double bonds" means conjugated linolic acid, isomerized conjugated linolic acid, isomerized conjugated linolenic acid and the like. Examples of the drying oils having an iodine value of more than 140 and a content of conjugated double bonds of less than 50% (hereinlater referred to simply as drying oils) include isomerized linseed oil, dehydrated castor oil, tall oil, linseed oil, perilla oil, safflower oil, hempseed oil, sardine oil, cuttlefish oil and the like.

The isomerized linseed oil means a triglyceride of fatty acids of conjugated linseed oil which is obtained by isomerizing linseed oil by an alkali process, a nickel process, a sulfite process, an iodine compound process, and oxidation process or a tert-butyl hypochlorite process to form conjugated double bonds in position, and has iodine value of from 140 to 170. The content of conjugated double bonds is generally in the range of 10–40%. The isomerized linseed oil as defined above is commercially available from The Nisshin Oil Mills, Ltd., under the designation of Nisshin NC-101. In a broad sense, the isomerized linseed oil useful in the present invention includes diesters of ethylene glycol or propylene glycol and linolenic acid and/or linolic acid which is one component of fatty acids of the isomerized linseed oil and monoesters of monohydric alcohols and the above-mentioned acids.

The dehydrated castor oil means a triglyceride of fatty acids chiefly composed of conjugated and non-conjugated linolic acid which are obtained by dehydrating castor oil in the presence or absence of a catalyst, and has iodine value of more than 140. In general, the content of the conjugated double bonds is in the range of 20–50%. The dehydrated castor oil as defined above is commercially available under the designations of Hy-diene (Soken Chem. Co., Ltd.) and D.C.O. (Ito Oil Mfg. Co., and Nikka Fat and Oil Co., Ltd.).

The dehydrated castor oil usable in the process of the invention further includes esters of conjugated linolic acid which is one component of fatty acids of the dehydrated castor oil or a mixture thereof with non-conjugated linolic acid, and of mono- or di-hydric alcohols.

The tall oil means fatty acids of tall oil, glycerides of tall oil and rosins of tall oil. These substances greatly vary in properties depending on their processing history but have generally an iodine value of more than 150 and a content of conjugated double bonds of less than 15%.

Linseed oil, perilla oil, safflower oil, hempseed oil, sardine oil and cuttlefish oil, all of which contain as main components triglycerides of linolenic acid and linolic acid, have an iodine value of more than 140 but contain substantially no conjugated double bonds. In the practice of the invention, esters of linolenic acid and/or linolic acid which is a fatty acid component of these oils and mono- or dihydric alcohols are also included within the category of the drying oil.

Isopropenylphenol and its oligomers used in the practice of the invention are those expressed by the following formulae (1), (2) and (3):

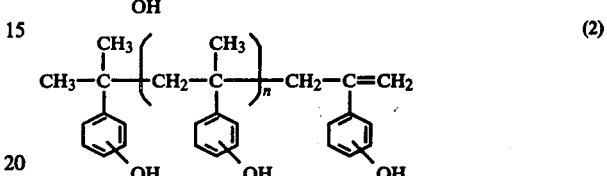

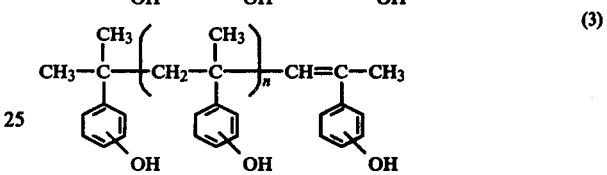

In the formulae (2)–(3), n is an integer of 0–18, and, in all the formulae, each hydroxyl group may be attached to any position of ortho, meta and para.

Among the above-indicated oligomers, the monomer, dimer and trimer are obtainable as pure compounds but higher oligomers including tetramer are generally obtained in the form of mixtures. These monomer and oligomers may be used singly or in combination.

According to the process of the invention, the drying oil is first reacted with isopropenylphenol and/or its oligomers in the presence of an acidic catalyst and in the presence or absence of a phenol to introduce the isopropenylphenol and/or its oligomers to the drying oil (this reaction is hereinlater referred to as a first-stage modification).

The isopropenylphenol and/or its oligomers are generally employed in an amount, by weight, of 0.1–2 times, preferably 0.3–1.5 times, as great as that of the drying oil. Larger amount than 2 times that of the drying oil will result in unsatisfactory punching quality of a final laminate. Less amount than 0.1 time that of the drying oil can not give a satisfactory effect of the modification. When this unsatisfactorily modified oil is used to prepare a phenolic resin, the drying oil separates from the phenolic resin, rendering the resin composition inhomogenous.

Various types of acids are usable as the acidic catalyst in the first-stage modification and include, for example, mineral acids such as sulfuric acid, nitric acid, phosphoric acid, hydrochloric acid, boric acid, etc., organic acids such as p-toluenesulfonic acid, oxalic acid, etc., and cation exchange resins such as of a sulfonic acid type and a carboxylic acid type. The amount of the catalyst may vary in a wide range depending on the type of acid but is generally in the range of 100–5,000 ppm, preferably 300–3,000 ppm, of a total amount of the reactants, i.e. isopropenylphenol and/or its oligomers, and drying oil and, in some case, phenols.

The first-stage modification is feasible by mixing isopropenylphenol and/or its oligomers, the drying oil phenols, is desired, and the acidic catalyst in the above-defined ranges and treating the mixture at a temperature of 65°–150° C. for a time of 0.5–3 hours. The reaction at lower temperature or for a shorter time than the above defined range will result in insufficient introduction of isopropenylphenol and/or its oligomers to the drying oil. In the other hand, a higher reaction temperature or a longer reaction time is unsuitable since polymerization of the drying oil is apt to be induced.

The completion of the modification reaction can be readily confirmed by knowing substantial disappearance of the isopropenylphenol component by a suitable means such as a gaschromatography.

The first-stage modification reaction may be conducted in the absence of solvent but is preferred to be carried out in the presence of phenols other than the isopropenylphenol and/or its oligomers (hereinafter referred to simply as a phenol or phenols). This is because the phenol dissolves isopropenylphenol and/or its oligomers and this accelerates the modification reaction. Examples of such phenols include butylphenol, amylphenol, hexylphenol, octylphenol, nonylphenol, dodecylphenol, phenylphenol, styrenated phenol, cumylphenol, bisphenol A, phenol, cresol, xylenol, catechol, resorcin, etc.

These phenols are genrally used in an amount, by weight, of up to 5 times that of isopropenylphenol and/or its oligomers. Larger amount does not appear to offer any particular advantages.

The reaction product obtained by the first-stage modification is generally in the form of a liquid and is brown in color. Especially when the modification is conducted in the presence of the above-indicated phenol, the reaction product is uniformly dissolved in the phenol.

The reaction product obtained by the first-stage modification is then reacted with a phenol or phenols in the presence of an acidic catalyst to introduce the phenol or phenols to the drying oil which have been introduced with isopropenylphenol and/or its oligomers (and this reaction will be hereinlater referred to as a second-stage modification). If the reaction product of the first-stage modification contains the phenol, the phenol may be removed from the reaction product prior to the second-stage modification reaction, if necessary, or the reaction product containing the phenol may be used as it is without removal of the phenol. Further, it is unnecessary to remove or neutralize the acidic catalyst employed for the first-stage modification reaction.

The phenols employable in the second-stage modification reaction are those which are particularly indicated for the first-stage modification. If a phenol is used in the first-stage modification, the phenol and a phenol used in the second-stage modification may be the same or different.

The amount of the phenols used in the second-stage modification reaction varies in relation to the amounts of the phenols employed in the first-stage modification reaction. The total amount of the phenols employed in the first-stage and the second-stage modifications is generally in the range, by weight, of 0.1–5 times, preferably 0.5–2 times, that of the drying oil. Less amount than 0.1 time that of the drying oil results in a final laminate which is unsatisfactory in mechanical strengths, and moisture and water proofs. Larger amount than 5 times that of the drying oil can not improve sufficiently the punching quality of a final laminate.

The reaction product obtained by the first-stage modification contains an acidic catalyst employed in the first stage. However, such residual catalyst is insufficient in amount to permit the second-stage modification reaction to proceed. Accordingly, it is necessary to freshly add an acidic catalyst in order to effect the second-stage modification reaction. The acidic catalyst suitable for the second-stage modification is a strong acid such as p-toluenesulfonic acid, sulfuric acid, hydrochloric acid, or the like acid. The amount of the acid is in the range of 500–10,000 ppm, preferably 1,000–5,000 ppm, of a total amount of the reactants, i.e., the reaction product of the first-stage modification and the phenol added for the second-stage modification reaction. Larger amount than 10,000 ppm tends to induce polymerization of the drying oil while less amount than 500 ppm does hardly assist in expediting the modification reaction. The reaction temperature and time in the second stage are preferred to be in the ranges of 80°–140° C. and 0.5–3 hours, respectively. These reaction conditions are much milder than known modification conditions where drying oils are modified with phenols, i.e., at temperatures of 80°–180° C. and for 1–6 hours.

The completion of the second-stage modification reaction can be confirmed by checking the amount of consumed phenol or phenols by a suitable means such as a gaschromatography.

The termination of the reaction can be carried out by neutralization using an alkali such as ammonia.

As a result, there is obtained a reaction product in the second-stage modification which is in the form of a liquid and brown in color.

The reaction products obtained in the first-stage and the second-stage modification reactions will be particularly described with regard to their structures.

In the first-stage modification, when, for example, a methyl ester of 9,11the presence acid is reacted with p-isopropenylphenol or its oligomer in thepresence of 1,000 ppm of a sulfuric acid catalyst at 100° C. for 1 hours, the resulting product has been found by a gaschromatography and a mass spectrum analysis to have such a structure that two molecules of p-isopropenylphenol or one molecule of p-isopropenylphenol dimer is added to or combined with one molecule of methyl 9,11-octadecadienoic acid ester. Further, the infrared absorption spectrum and nuclear magnetic resonance spectrum analyses reveal that the conjugated diene of 9,11-octadecadienoic acid remains as it is. Thus, it is believed that the reaction product obtained by the first-stage modification of dehydrated castor oil has, for example, the following chemical structure:

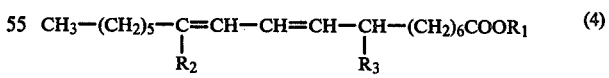

(wherein $R_1$ represents a glyceride residue, and $R_2$ and $R_3$ independently represent

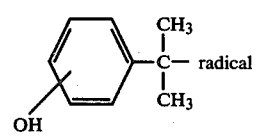

or $R_2$ represents a hydrogen atom and $R_3$ represents

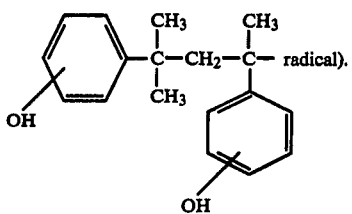

Then, the second-stage modification is conducted by reacting the reaction product with cresol in the presence of sulfuric acid in an amount of 2,800 ppm of the reaction mixture including cresol at 100° C. for 1 hour. The resulting reaction product, in the case that two molecules of cresol are introduced to the product, is assumed to have the following structural formula as determined by the infrared absorption spectrum and nuclear magnetic resonance spectrum analyses:

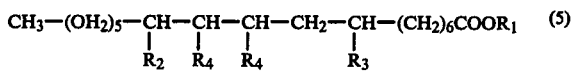

(wherein $R_1$, $R_2$ and $R_3$ have the same meanings as defined above, and $R_4$ represents

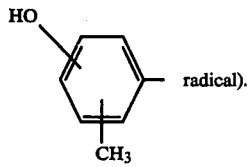

It will be seen from the above that when isopropenylphenol and/or its oligomers are reacted with the drying oil in the first-stage modification, the unsaturated double bonds of the drying oil remain as they are in the molecule of the reaction product. This can never be seen in case where drying oils are modified with phenols by known techniques. The remaining of the unsaturated double bonds which occurs only when the modification is conducted by use of isopropenylphenol and/or its oligomers is one of important features of the process of the invention. When, for example, dehydrated castor oil is modified with phenols by known techniques, the resulting product is that obtained by the Friedel-Crafts reaction, as described in Japanese Patent Publication No. 45-35918. The product introduced with two molecules of a phenol can be expressed, for example, by the following formula

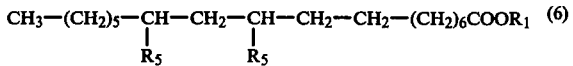

(wherein $R_1$ has the same meaning as defined hereinbefore and each $R_5$ represents

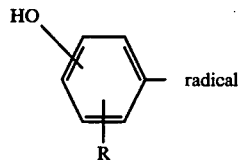

(where R represents such as alkyl group)).

In practice, the reaction product obtained in the second-stage modification is provided as part of phenolic components and reacted with formaldehyde or compounds based of formaldehyde (which will be defined hereinlater and referred herein to simply as formaldehyde) to produce a phenolic resin.

The production of the phenolic resin is feasible by any of methods including: a method in which the phenolic components and formaldehyde are reacted under acidic conditions to give a novolac type resin; a method in which are partly reacted under acidic conditions, followed by rendering the reaction system alkaline for undergoing subsequent reaction to obtain a novolacresol type resin; and a method in which the reaction product obtained after the modification reactions is rendered basic and reacted with formaldehyde to obtain a resol type resin. In order to obtain a resol type resin, the acidic catalyst which remains in the reaction product of the second-stage modification is first neutralized with ammonia, organic amines, etc., and then subjected to reaction with formaldehyde.

Whichever method is used for the production of phenolic resin, the reaction product after the second-stage modification is first added with a phenol or phenols to provide a phenolic component or composition, if required. The phenols added are the same as indicated hereinbefore with regard to the first-stage and the second-stage modification reactions. The phenols added in this stage and those employed for the first-stage and second-stage modifications may be the same or different.

The ratio of the added phenols to the reaction product after the second-stage modification is determined such that the drying oil is contained in the range of 10–100%, preferably 20–60%, by weight of a total amount of the phenolic components (i.e., a total amount of the added phenols, and isopropenylphenol and/or its oligomers and the phenols employed in the first-stage and the second-stage modification reactions, respectively). Less amount of the drying oil than 10 wt % results in a final laminate which is unsatisfactory in flexibility and is not improved in punching quality to a satisfactory extent. On the other hand, larger amount than 100 wt. % is not preferable since a laminate using such phenolic resin becomes poor in mechanical strengths.

The amount of the drying oil ranging 20–60 wt % is suitable for producing a phenolic resin to result in a final laminate which is excellent in punching quality and moisture and water proofs.

The term "formaldehyde or compounds on formaldehyde" means an aqueous solution of formaldehyde, paraformaldehyde as well as formaldehyde per se. The amount of the formaldehyde is generally in the range of 0.7–2.0 moles, preferably 0.8–1.6 moles, per mole of a total phenolic component. Outside the range, when the resulting phenolic resin is applied for making a laminated sheet, high density of crosslinkage can not be attained and the laminate becomes unfavorably low in mechanical strengths and moisture and water proofs.

The reaction of the phenolic component and formaldehyde is conducted in the presence of a catalyst. Where a novolac type resin is prepared, hydrochloric acid, oxalic acid, p-toluene-sulfonic acid, sulfuric acid and the like acids are employed as the catalyst. On the other hand, where a resol type resin is prepared, there are used as the catalyst ammonia, methylamine, dimethylamine, triethylamine, ethylenediamine, diethylamine, sodium hydroxide, potassium hydroxide and the like. As a matter of course, a novolac-resol type resin is obtainable by interacting the phenolic component and formaldehyde to an extent in the presence of the above-indicated acid, and adding a base to the reaction system to effect a further reaction under basic conditions.

The amount of the catalyst greatly varies depending on the kind of the catalyst but is in the range of 0.1–2 wt % of total reactants in the case of the acid and in the range of 0.05–5 wt % in the case of the base. Especially when a mixture of ethylene diamine, ammonia and/or an organic amine which contains 10–20 mole % of ethylenediamine is used, the resulting phenolic resin can yield a laminate showing excellent properties.

The reaction temperature and time vary depending on the kinds of phenols in the phenolic component, the kind and amount of acid or base, and other reaction parameters, but is generally in the ranges of 80°–110° C. and 1–5 hours, respectively.

By measuring a time required for the gelation of the reaction mixture at 150° C., it is confirmed that the polyaddition and polycondensation of the phenolic component and formaldehyde has proceeded to a desired extent, thus determining the end of the reaction. After completion of the reaction, the reaction system is subsequently treated for removing water from the system to obtain a modified phenolic resin. The thus obtained modified phenolic resin can be dissolved in various kinds of solvents to give varnishes. Examples of such solvents are aromatic hydrocarbons such as benzene, toluene, xylene, etc., ketones such as acetone, methyl ethyl ketone, etc., alcohols such as methanol, ethanol, etc., and mixtures thereof. The resin varnish is impregnated in a suitable substrate such as of paper, glass cloth, etc., and dried to give a prepreg. These prepregs are superposed one on another and pressed under heating conditions to obtain a laminate.

The process of the present invention has a number of advantages which will be understood from the following description.

Drying oils having an iodine value of more than 140 and a content of conjugated double bonds of less than 50% are generally poor in reactivity with phenols, so that it is difficult to apply the oils for preparation of modified phenolic resins. Applicable drying oils have been limited only to those which have high content of conjugated double bonds, e.g., tung oil.

According to the process of the invention, however, drying oils which are low in content of conjugated double bond are efficiently introduced with isopropenylphenol and/or its oligomers and phenols. These phenol-introduced oils are effectively usable for preparing modified phenolic resins. In other words, drying oils of the specific type which have been considered difficult to use in preparation of modified phenolic resins can be effectively utilized for preparing modified phenolic resins according to the process of the invention.

The present invention has another advantage that it is possible to introduce isopropenylphenol and/or its oligomers to drying oils under relatively mild conditions in the first-stage modification. In the reaction product obtained in the first-stage modification, the double bonds of the oils remain as they are without disappearance as shown, for example, in the foregoing formula (4). This has never been experienced in the case where drying oils are modified with phenols according to known methods, and is believed to be based on the specific reactivity of isopropenylphenol used in the present invention.

Since the double bonds of drying oils remain, as they are, in the reaction product of the first-stage modification, hydroxyphenyl radicals can be further introduced to the oils in the second-stage modification using phenols. The modification treatments of drying oils consisting of the two stages ensure introduction of hydroxyphenyl radicals in much greater amount per molecule of the drying oil than in the case of known methods. In addition, polymerization of drying oils can be suppressed by conducting the modifications by two stages.

Accordingly, a further advantage of the invention is that when used as part of the phenolic component for reaction with formaldehyde, the reaction product obtained in the second-stage modification readily reacts with formaldehyde and can thus be introduced with methylol radicals at high rate. The resulting phenolic resin can be easily dissolved in solvent to give a uniform and stable varnish. The varnish is ready to permeate into substrates, ensuring uniform impregnation.

When treating the resulting prepregs under heating and pressurizing conditions for lamination, it has been found that the phenolic resin of this type increases in crosslinking density and the laminate obtained is improved in interlaminar strength. The laminate using the modified phenolic resin obtained according to the process of the invention is not only flexible and excellent in punching quality, but also excellent in electrical characteristics, moisture and water proofs, chemical resistance and mechanical strengths.

The present invention will be particularly described by way of the following Examples and Comparative Examples, inn which percentage is by weight unless otherwise indicated.

EXAMPLE 1

270 g of a mixture of p-isoprophenylphenol and its oligomers having a composition of 3% of p-isopropenylphenol, 87% of its dimer and 10% of a trimer and higher oligomers and 395 g of isomerized linseed oil were maintained at 140° C. under agitation. 1.7 g of 85% phosphoric acid was charged into the mixture, followed by agitating for 2 hours. After completion of the reaction, the reaction mixture was cooled, to which were added 193 g of synthetic cresol (consisting of 60% of m-isomer and 40% of p-isomer) and 5.5 g of 20% sulfuric acid for further reaction at 100° C. for 1 hour.

Thereafter, 430 g of phenol, 210 g octylphenol, 210 g of nonylphenol, 1010 g of 37% aqueous solution of formaldehyde, 32 g of 24.5% aqueous ammonia and 3.1 g of ethylenediamine were added to the reaction system for reaction at 98°–100° C. for 5 hours. Then, water was removed under reduced pressure. After cooling, the resulting resin was dissolved in a mixed solvent consisting of methanol and toluene in a mixing ratio of 2:1 to obtain a varnish having a resin concentration of 50%.

The thus obtained resin varnish was impregnated in sheets of 10 mils thick linter paper and dried to obtain prepregs each having a resin content of 45%. Nine prepregs were superposed and laminated under a pressure of 90 kg/c$^2$, at 160° C. for 50 minutes to obtain a laminate.

Further, the above lamination procedure was repeated using a 35μ thick copper foil to obtain a copper-clad laminate. The both laminates had a thickness of 1.6 mm.

EXAMPLE 2

270 g of a mixture of p-isopropenylphenol and its oligomers having a composition of 20% of p-isopropenylphenol, 69% of the dimer, and 11% of the trimer and higher oligomers thereof, 210 g of nonylphenol and 395 g of isomerized linseed oil were maintained at 140° C. under agitation, to which was added 1.95 g of 40% p-toluenesulfonic acid. The mixture was agitated for 2 hours for reaction. After completion of the reaction, the reaction mixture was cooled, to which were further added 190 g of synthetic cresol (consisting of 60% of m-isomer and 40% of p-isomer) and 4.0 g of 20% sulfuric acid for reaction at 100° C. for 1 hour.

To the reaction system were further added 430 g of phenol, 210 g of octylphenol, 1010 g of 37% aqueous solution of formaldehyde, 32 g of 24.5% of aqueous ammonia, and 3.1 g of ethylenediamine for reaction at 98°–100° C. for 4 hours. Then, water was removed under reduced pressure and the resulting reaction product was cooled and dissolved in a mixed solvent consisting of methanol and toluene in a mixing ratio of 2:1 to obtain a varnish having a resin concentration of 50%. Then, Example 1 was repeated to give a laminate and a copper-clad laminate each 1.6 mm in thickness.

EXAMPLE 3

200 g of a mixture of p-isoprophenylphenol and its oligomers having a composition of 10% of p-isopropenylphenol, 75% of its dimer and 15% of trimer and high oligomers, 177 g of phenol and 300 g of isomerized linseed oil were maintained at 85° C. under agitation, to which was added 3.7 g of 20% sulfuric acid. The reaction system was agitated for 2 hours for reaction. After completion of the reaction, the system was cooled and added with 150 g of synthetic cresol (consisting of 60% of m-isomer and 40% of p-isomer) and 3.8 g of 20% sulfuric acid for reaction at 100° C. for 1 hour.

To the reaction system were further added 200 g of phenol, 289.6 g of nonylphenol, 845 g of 37% aqueous solution of formaldehyde, 30 g of 24.5% aqueous ammonia, and 2.6 g of ethylenediamine for reaction at 98°–100° C. for 4 hours. Water was removed from the reaction system under reduced pressure and the product was cooled and dissolved in a mixed solvent consisting of methanol and toluene in a mixing ratio of 2:1 to obtain a varnish having a resin concentration of 50%.

Then, the procedure of Example 1 was repeated to obtain a laminate and a copper-clad laminate each 1.6 mm in thickness.

EXAMPLE 4

340 g of a mixture of p-isopropenylphenol and its oligomers having a composition of 95% of p-isopropenylphenol, 3% of dimer, and 2% of trimer and higher oligomers and 500 g of dehydrated castor oil were maintained at 140° C. under agitation, to which was further added 2.2 g of 85% phosphoric acid, followed by agitating for 2 hours for reaction. After completion of the reaction, the reaction system was cooled, to which were further added 244 g of synthetic cresol (consisting of 60% of m-isomer and 40% of p-isomer) and 7.0 g of 20% sulfuric acid for reaction at 100° C. for 1 hour. To the reaction system were then added 544 g of phenol, 266 g of octylphenol, 266 g of nonylphenol, 1278 g of 37% aqueous solution of formaldehyde, 41 g of 24.5% aqueous ammonia and 3.9 g of ethylenediamine for reaction at 98°–100° C. for 5 hours. Then, water was removed from the reaction system under reduced pressure and the resulting product was cooled and dissolved in a mixed solvent consisting of methanol and toluene in a mixing ratio of 2:1 to obtain a varnish having a resin concentration of 50%.

Then, the procedure of Example 1 was repeated to give a laminate and a copper-clad laminate each 1.6 mm in thickness.

EXAMPLE 5

340 g of a mixture of p-isopropenylphenol and oligomers thereof having a composition of 3% of p-isopropenylphenol, 87% of dimer, and 10% of trimer and higher oligomers and 500 g of dehydrated castor oil were maintained at 140° C. under agitation, into which was charged 2.2 g of 85% phosphoric acid. The reaction system was agitated for 2 hours for reaction. After completion of the reaction, the system was cooled and added with 127 g of phenol, 127 g of resorcine and 7.2 g of 20% sulfuric acid for reaction at 100° C. for 1 hour.

To the reaction system were thereafter added 520 g of phenol, 253 g of octylphenol, 260 g of nonylphenol, 1278 g of 37% aqueous solution of formaldehyde, 40.5 g of 24.5% aqueous ammonia and 4.30 g of ethylenediamine for reaction at 98°–100° C. for 4 hours. Then water was removed from the system under reduced pressure and the resulting product was cooled and dissolved in a mixed solvent of methanol and toluene in a mixing ratio of 2:1 to obtain a varnish having a resin concentration of 50%.

Then, the procedure of Example 1 was repeated to obtain a laminate and a copper-clad laminate each 1.6 mm in thickness.

EXAMPLE 6

350 g of a mixture of p-isopropenylphenol and its oligomers having a composition of 98% of p-isopropenylphenol and 2% of dimer and trimer thereof and 510 of linseed oil were maintained at 120° C. under agitation, into which was charged 2.2 g of 40% sulfuric acid, followed by agitating for 2 hours for reaction. After completion of the reaction, 244 g of synthetic cresol (consisting of 60% of m-isomer and 40% of p-isomer) and 3.5 g of 40% sulfuric acid were added to the reaction system for further reaction at 100° C. for 1.5 hours.

To the system were further added 550 g of phenol, 530 g of nonylphenol, 1280 g of 37% aqueous solution of formaldehyde, 41 g of 24.5% aqueous ammonia and 4.0 g of ethylenediamine for reaction at 98°–100° C. for 5 hours. Then water was removed from the system under reduced pressure and the resulting product was cooled and dissolved in a mixed solvent consisting of methanol and toluene in a mixing ratio of 2:1 to obtain a varnish having a resin concentration of 50%.

Thereafter, the procedure of Example 1 was repeated to obtain a laminate and a copper-clad laminate each 1.6 mm in thickness.

EXAMPLE 7

350 g of p-isopropenylphenol having a composition of 98% of p-isopropenylphenol and 2% of dimer and trimer thereof, 300 g of phenol and 600 g of linseed oil were maintained at 85° C. under agitation, into which was charged 3.1 g of 40% sulfuric acid, followed by agitating for 2.5 hours for reaction. After completion of the reaction, 230 g of synthetic cresol and 2.8 g of 40% sulfuric acid were added to the system for further reaction at 100° C. for 1.5 hours.

To the reaction system were further added 350 g of phenol, 480 g of nonylphenol, 1400 g of 37% aqueous solution of formaldehyde, 50 g of 24.5% aqueous ammonia and 4.3 g of ethylenediamine for reaction at 98°–100° C. for 4 hours. Then water was removed from the system under reduced pressure and, after cooling, the resulting product was dissolved in a mixed solvent of methanol and toluene in a mixing ratio of 2:1 to obtain a varnish having a resin concentration of 50%.

Then, the procedure of Example 1 was repeated to obtain a laminate and a copper-clad laminate each 1.6 mm in thickness.

EXAMPLE 8

350 g of p-isopropenylphenol oligomers having a composition of 90% of p-isopropenylphenol dimer and 10% of trimer and higher oligomers, 270 g of nonylphenol, and 500 g of linseed oil were maintained at 140° C. under agitation, into which was charged 2.5 g of 85% phosphoric acid, followed by agitating for 2 hours for reaction. After completion of the reaction, the reaction system was cooled, to which were added 250 g of synthetic cresol and 2.3 g of 40% sulfuric acid for further reaction at 100° C. for 1 hour.

To the reaction system were further added 540 g of phenol, 250 g of octylphenol, 1300 g of 37% aqueous solution of formaldehyde, 40.5 g of 24.5% aqueous ammonia and 4.0 g of ethylenediamine for reaction at 98°–100° C. for 4 hours. Then water was removed from the system under reduced pressure and, after cooling, the resulting product was dissolved in a mixed solvent of methanol and toluene in a mixing ratio of 2:1 to obtain a varnish having a resin concentration of 50%.

Then, the procedure of Example 1 was repeated to obtain a laminate and a copper-clad laminate each 1.6 mm in thickness.

EXAMPLE 9

340 g of oligomers of p-isopropenylphenol having a composition of 90% of p-isopropenylphenol dimer and 10% of trimer and higher oligomers and 500 g of cuttlefish oil were maintained at 100° C. under agitation, into which was charged 2.2 g of 85% phosphoric acid. The reaction system was agitated for 2 hours for reaction. After completion of the reaction, 200 g of synthetic cresol, 80 g of xylenol and 3.8 g of 40% sulfuric acid were added to the system for further reaction at 100° C. for 1 hour. To the system were further added 540 g of phenol, 260 g of octylphenol, 270 g of nonylphenol, 1300 g of 37% aqueous solution of formaldehyde, 41 g of 24.5% aqueous ammonia and 4.0 g of ethylenediamine for reaction at 98°–100° C. for 4 hours. Then water was removed from the system under reduced pressure and, after cooling, the resulting product was dissolved in a mixed solvent of methanol and toluene in a mixing ratio of 2:1 to obtain a varnish having a resin concentration of 50%.

Then, the procedure of Example 1 was repeated to obtain a laminate and a copper-clad laminate each 1.6 mm in thickness.

EXAMPLE 10

350 g of p-isopropenylphenol having a composition of 98% of p-isopropenylphenol and 2% of dimer and trimer thereof, 266 g of nonylphenol and 650 g of glyceride of tall oil were maintained at 100° C. under agitation, into which 5.5 g of 20% sulfuric acid was charged, followed by agitating for 2 hours for reaction. After completion of the reaction, 240 g of synthetic cresol and 5.1 g of 20% sulfuric acid were further added to the reaction system for further reaction at 100° C. for 1.3 hours. To the system were further added 560 g of phenol, 270 g of octylphenol, 1280 g of 37% aqueous solution of formaldehyde, 41 g of 24.5% aqueous ammonia and 3.9 g of ethylenediamine for reaction at 98°–100° C. for 3.5 hours. Then water was removed from the system under reduced pressure and, after cooling, the resulting produce was dissolved in a mixed solvent of methanol and toluene in a mixing ratio of 2:1 to obtain a varnish having a resin concentration of 50%.

Then, the procedure of Example 1 was repeated to obtain a laminate and a copper-clad laminate each 1.6 mm in thickness.

EXAMPLE 11

340 g of oligomers of p-isopropenylphenol having a composition of 90% of p-isopropenylphenol dimer and 10% of trimer and higher oligomers and 500 g of glyceride of tall oil were maintained at 100° C. under agitation, into which was charged 2.2 g of 85% phosphoric acid, followed by agitating for 2 hours for reaction. After completion of the reaction, the reaction system was cooled and added with 200 g of synthetic cresol, 80 g of xylenol and 3.8 g of 40% sulfuric acid for reaction at 100° C. for 1 hour. To the system were further added 540 g of phenol, 260 g of octylphenol, 270 g of nonylphenol, 1300 g of 37% aqueous solution of formaldehyde, 41 g of 24.5% aqueous ammonia and 4.0 g of ethylenediamine for reaction at 98°–100° C. for 4 hours. Then water was removed from the system under reduced pressure and, after cooling, the resulting product was dissolved in a mixed solvent of methanol and toluene in a mixing ratio of 2:1 to obtain a varnish having a resin concentration of 50%.

Then, the procedure of Example 1 was repeated to obtain a laminate and a copper-clad laminate each 1.6 mm in thickness.

EXAMPLE 12

340 g of oligomers of p-isopropenylphenol having a composition of 90% of p-isopropenylphenol dimer and 10% of trimer and higher oligomers and 500 g of tall oil were maintained at 140° C. under agitation, into which was charged 2.2 g of 85% phosphoric acid. The mixture was agitated for 2 hours for reaction. After completion of the reaction, the reaction system was cooled, to which were further added 130 g of phenol, 130 g of resorcine and 3.6 g of 40% sulfuric acid for further reaction at 100° C. for 2 hours.

To the reaction system were then added 500 g of phenol, 250 g of octylphenol, 280 g of nonylphenol, 1278 g of 37% aqueous solution of formaldehyde, 41 g of 24.5% aqueous ammonia and 4.3 g of ethylenediamine for reaction at 98°–100° C. for 4 hours. Then water was removed from the system under reduced pressure and, after cooling, the resulting product was dissolved in a mixed solvent of methanol and toluene in a mixing ratio of 2:1 to obtain a varnish having a resin concentration of 50%.

Thereafter, the procedure of Example 1 was repeated to obtain a laminate and a copper-clad laminate each 1.6 mm in thickness.

Comparative Example 1

423 g of cresol, 210 g of isomerized linseed oil and 13.65 g of 20% sulfuric acid were mixed for reaction at 120° C. for 3 hours. After completion of the reaction, the reaction system was cooled, to which were added 551 g of 37% aqueous solution of formaldehyde, 139 g of nonylphenol, 139 g of octylphenol, 20 g of 24.5% aqueous ammonia and 1.6 g of ethylenediamine for reaction at 97°-98° C. for 2.5 hours. Then water was removed from the system under reduced pressure and, after cooling, the resulting product was dissolved in a mixed solvent of methanol and toluene in a mixing ratio of 2:1 to obtain a varnish having a resin concentration of 50%.

Then, the procedure of Example 1 was repeated to obtain a laminate and a copper-clad laminate each 1.6 mm in thickness.

Comparative Example 2

604 g of cresol, 300 g of dehydrated castor oil and 19.5 g of 20% sulfuric acid were mixed for reaction at 120° C. for 3 hours. After completion of the reaction, the reaction system was cooled, to which were added 757 g of 37% aqueous solution of formaldehyde, 200 g of nonylphenol, 200 g of octylphenol, 26.6 g of 24.5% aqueous ammonia and 2.3 g of ethylenediamine for further reaction at 97°-98° C. for 2.5 hours. Then water was removed from the reaction system under reduced pressure and, after cooling, the resulting product was dissolved in a mixed solvent of methanol and toluene in a mixing ratio of 2:1 to obtain a varnish having a concentration of 50%.

Then, the procedure of Example 1 was repeated to obtain a laminate and a copper-clad laminate each 1.6 mm in thickness.

Comparative Example 3

600 g of cresol, 350 g of linseed oil and 14.3 g of 40% sulfuric acid were mixed for reaction at 120° C. for 3 hours. After completion of the reaction, the reaction system was cooled, to which were added 760 g of 37% aqueous solution of formaldehyde, 200 g of nonylphenol, 200 g of octylphenol, 29.0 g of 24.5% aqueous ammonia and 2.5 g of ethylenediamine for reaction at 98°-100° C. for 2.5 hours. Then water was removed from the reaction system under reduced pressure and, after cooling, the resulting product was dissolved in a mixed solvent of methanol and toluene in a mixing ratio of 2:1 to obtain a varnish having a resin concentration of 50%.

Then, the procedure of Example 1 was repeated to obtain a laminate and a copper-clad laminate each 1.6 mm in thickness.

Comparative Example 4

300 g of p-isopropenylphenol oligomers having a composition of 90% of p-isopropenylphenol dimer and 10% of trimer and higher oligomers, 264 g of phenol and 450 g of linseed oil were maintained at 85° C. under agitation, into which was charged 2.9 g of 40% sulfuric acid, followed by agitating for 2 hours. To the reaction system were further added 380 g of synthetic cresol, 110 g of nonylphenol, 110 g of octylphenol, 630 g of 37% aqueous solution of formaldehyde, 23.0 g of 24.5% aqueous ammonia and 2.0 g of ethylenediamine for reaction at 97°-98° C. for 2.5 hours. Then water was removed from the reaction system under reduced pressure. Upon gelation, the phenolic resin and linseed oil separated each other and thus the resulting modified phenolic resin was inhomogeneous. The resin could not be used for making a laminate.

Comparative Example 5

600 g of cresol, 350 g of glyceride of tall oil and 14.3 g of 40% sulfuric acid were mixed for reaction at 120° C. for 3 hours. After completion of the reaction, 760 g of 37% aqueous solution of formaldehyde, 200 g of nonylphenol, 200 g of octylphenol, 29.0 g of 24.5% aqueous ammonia and 2.5 g of ethylenediamine were added to the reaction system for further reaction at 98°-100° C. for 2.5 hours. Then water was removed from the system under reduced pressure and, after cooling, the resulting product was dissolved in a mixed solvent of methanol and toluene in a mixing ratio of 2:1 to obtain a varnish having a resin concentration of 50%.

Then, the procedure of Example 1 was repeated to obtain a laminate and a copper-clad laminate each 1.6 mm in thickness.

The laminates obtained in the foregoing Examples and Comparative Examples were tested to determine their characteristic properties with the results of Table below.

The test was carried out by the following methods.

(1) Water absorption, insulating resistance, hot solder resistance and resistance to trichloroethylene were determined according to the methods prescribed in JIS (Japanese Industrial Standard) C 6481.
(2) Punching quality was determined according to the method prescribed in ASTM D-614-44.
(3) Dimensional variation was determined by a method wherein a test piece having a size of 140 mm in length and 13 mm in width was heated at 100° C. for 24 hours and then cooled down to room temperature.
(4) Warp was determined by a method wherein a test piece having a size of 140 mm × 13 mm was heated at 100° C. for 24 hours and then cooled down to room temperature.

A straight ruler was laid on the concave parts of the laminate and the greatest clearance was measured as the warp of the sample.

Table

| | Example | | | | | | |
|---|---|---|---|---|---|---|---|
| | 1 | 2 | 3 | 4 | 5 | 6 | 7 |
| Water Absorption (%) | | | | | | | |
| E-24/50 + D-24/23 | 0.77 | 0.81 | 0.79 | 1.24 | 1.15 | 1.11 | 1.09 |
| Insulating Resistance (Ω) | | | | | | | |
| Normal State C-90/20/65 | $5.3 \times 10^{13}$ | $3.1 \times 10^{13}$ | $2.8 \times 10^{13}$ | $1.4 \times 10^{12}$ | $9.0 \times 10^{12}$ | $8.5 \times 10^{12}$ | $1.2 \times 10^{12}$ |
| After Boiling C-90/20/65 + D-2/100 | $9.5 \times 10^{9}$ | $9.0 \times 10^{9}$ | $7.3 \times 10^{9}$ | $4.7 \times 10^{9}$ | $7.5 \times 10^{8}$ | $2.1 \times 10^{8}$ | $4.8 \times 10^{8}$ |
| Hot Solder Resistance (sec/260° C.) | 57 | 59 | 45 | 34 | 37 | 35 | 37 |
| Resistance to Trichloro- | Satisfactory | Satisfactory | Satisfactory | Satisfactory | Satisfactory | Satisfactory | Satisfactory |

Table-continued

| ethylene | over 5 min. | over 5 min. | over 5 min. | over 5 min. | over 5 min. | over 5 min. | over 5 min. |
|---|---|---|---|---|---|---|---|
| Punching Quality 27° C. | 90 | 90 | 90 | 90 | 90 | 90 | 90 |
| Dimensional Variation (mm) | | | | | | | |
| Longitudinal Direction | 0.08 | 0.13 | 0.12 | 0.11 | 0.11 | 0.16 | 0.16 |
| Transverse Direction | 0.12 | 0.20 | 0.24 | 0.19 | 0.19 | 0.27 | 0.15 |
| Warp (mm) | | | | | | | |
| Longitudinal Direction | 0.10 | 0.15 | 0.13 | 0.05 | 0.07 | 0.26 | 0.24 |
| Transverse Direction | 0.15 | 0.27 | 0.20 | 0.10 | 0.10 | 0.26 | 0.25 |

| | Example | | | | | Comparative Example | |
|---|---|---|---|---|---|---|---|
| | 8 | 9 | 10 | 11 | 12 | 1 | 2 |
| Water Absorption (%) | | | | | | | |
| E-24/50 + D-24/23 | 1.02 | 1.30 | 1.06 | 0.97 | 1.41 | 1.85 | 1.69 |
| Insulating Resistance (Ω) | | | | | | | |
| Normal State C-90/20/65 | $6.2 \times 10^{12}$ | $3.8 \times 10^{12}$ | $3.1 \times 10^{13}$ | $7.3 \times 10^{13}$ | $2.1 \times 10^{12}$ | $9.7 \times 10^{12}$ | $4.3 \times 10^{11}$ |
| After Boiling | | | | | | | |
| C-90/20/65 + D-2/100 | $1.0 \times 10^{8}$ | $8.8 \times 10^{8}$ | $8.2 \times 10^{7}$ | $6.1 \times 10^{7}$ | $1.2 \times 10^{7}$ | $8.5 \times 10^{7}$ | $3.4 \times 10^{7}$ |
| Hot Solder Resistance | | | | | | | |
| (sec/260° C.) | 32 | 29 | 25 | 27 | 20 | 18 | 16 |
| Resistance to Trichloro- | Satisfactory | Satisfactory | Satisfactory | Satisfactory | Satisfactory | Unsatisfactory in 2 min. | Unsatisfactory in 2 min. |
| ethylene | over 5 min. | over 5 min. | over 5 min. | over 5 min. | over 5 min. | | |
| Punching Quality 27° C. | 90 | 90 | 90 | 90 | 90 | 50 | 60 |
| Dimensional Variation (mm) | | | | | | | |
| Longitudinal Direction | 0.17 | 0.22 | 0.12 | 0.12 | 0.10 | 0.69 | 0.57 |
| Transverse Direction | 0.20 | 0.23 | 0.09 | 0.18 | 0.18 | 0.81 | 0.85 |
| Warp (mm) | | | | | | | |
| Longitudinal Direction | 0.28 | 0.26 | 0.10 | 0.10 | 0.25 | 0.83 | 0.81 |
| Transverse Direction | 0.24 | 0.30 | 0.15 | 0.15 | 0.30 | 1.59 | 1.11 |

| | Comparative Example | |
|---|---|---|
| | 3 | 5 |
| Water Absorption (%) | | |
| E-24/50 + D-24/23 | 1.58 | 2.13 |
| Insulating Resistance (Ω) | | |
| Normal State C-90/20/65 | $4.3 \times 10^{11}$ | $9.1 \times 10^{11}$ |
| After Boiling | | |
| C-90/20/65 + D-2/100 | $9.0 \times 10^{7}$ | $4.1 \times 10^{6}$ |
| Hot Solder Resistance | | |
| (sec/260° C.) | 12 | 12 |
| Resistance to Trichloro- | Unsatisfactory | Unsatisfactory |
| ethylene | in 2 min. | in 2 min. |
| Punching Quality 27° C. | 50 | 60 |
| Dimensional Variation (mm) | | |
| Longitudinal Direction | 0.18 | 0.51 |
| Transverse Direction | 0.25 | 0.82 |
| Warp (mm) | | |
| Longitudinal Direction | 0.50 | 0.65 |
| Transverse Direction | 0.10 | 0.80 |

What is claimed is:

1. A process for producing a modified phenolic resin by using a drying oil introduced with phenols, the process comprising the steps of:
   reacting a drying oil having an iodine value of more than 140 and a content of conjugated double bonds of less than 50% with isopropenylphenol and/or oligomers thereof in the presence of an acidic catalyst and in the presence or absence of phenols to introduce the isopropenylphenol and/or oligomers thereof to said drying oil;
   further reacting said drying oil which has been introduced with the isopropenylphenol and/or oligomers thereof with at least one phenol in the presence of an acidic catalyst to introduce said at least one phenol to said drying oil; and
   providing said drying oil which has been introduced with the isopropenylphenol and/or oligomers thereof and said at least one phenol, as part of a phenolic component to react with formaldehyde or compounds based on formaldehyde.

2. A process according to claim 1, wherein said drying oil having an iodine value of more than 140 and a content of conjugated double bonds of less than 50% is isomerized linseed oil.

3. A process according to claim 1, wherein said drying oil having an iodine value of more than 140 and a content of conjugated double bonds of less than 50% is dehydrated castor oil.

4. A process according to claim 1, wherein said drying oil having an iodine value of more than 140 and a content of conjugated double bonds of less than 50% is tall oil.

5. A process according to claim 1, wherein said drying oil having an iodine value of more than 140 and a content of conjugated double bonds of less than 50% is a member selected from the group consisting of linseed oil, perilla oil, safflower oil, hempseed oil, sardine oil and cuttlefish oil.

* * * * *